(12) United States Patent
Zimbrich et al.

(10) Patent No.: US 6,601,872 B2
(45) Date of Patent: Aug. 5, 2003

(54) COMPACT MULTI-LEVEL INFLATOR

(75) Inventors: Robert C. Zimbrich, Knoxville, TN (US); Brian O. Thomas, Alcoa, TN (US); Douglas H. Freel, Knoxville, TN (US); James M. Rose, Knoxville, TN (US); Darton E. Griest, Knoxville, IN (US)

(73) Assignee: Atlantic Research Corporation, Gainesville, VA (US)

( * ) Notice: Subject to any disclaimer, the term of this patent is extended or adjusted under 35 U.S.C. 154(b) by 21 days.

(21) Appl. No.: 09/930,475

(22) Filed: Aug. 16, 2001

(65) Prior Publication Data

US 2003/0034641 A1 Feb. 20, 2003

(51) Int. Cl.$^7$ .............................................. B60R 21/28
(52) U.S. Cl. ........................................ 280/737; 280/741
(58) Field of Search ................................ 280/737, 740, 280/741, 742

(56) References Cited

U.S. PATENT DOCUMENTS

| | | | | |
|---|---|---|---|---|
| 5,351,988 A | * | 10/1994 | Bishop et al. | 280/737 |
| 5,553,889 A | * | 9/1996 | Hamilton et al. | 280/736 |
| 5,794,973 A | * | 8/1998 | O'Loughlin et al. | 280/737 |
| 5,813,694 A | * | 9/1998 | Jeong | 280/737 |
| 6,068,292 A | * | 5/2000 | Renz | 280/737 |
| 6,189,922 B1 | * | 2/2001 | Parks et al. | 280/735 |
| 6,234,523 B1 | * | 5/2001 | Tokoro et al. | 280/737 |
| 6,253,683 B1 | * | 7/2001 | Fukabori | 102/530 |

* cited by examiner

Primary Examiner—Paul N. Dickson
Assistant Examiner—Faye M. Fleming
(74) Attorney, Agent, or Firm—Nixon & Vanderhye, PC; Frank P. Presta

(57) ABSTRACT

A multi-level inflator for an air bag or other safety restraint device, comprising an elongated pressure vessel having a primary gas generating portion with a first open end and a gas storage portion with a second open end. The primary gas generating portion has a primary initiator and primary gas generating energetics disposed therein, the initiator being mounted on an igniter body secured to and closing the pressure vessel at the first open end thereof. A pressure vessel closure is secured to the second end of the pressure vessel, the closure having an aperture therethrough and a primary rupture disk secured thereto to close the aperture. The gas storage portion has an inert gas therein under a predetermined pressure. A secondary inflator of the all-pyrotechnic type is secured to the pressure vessel and closure at the second end thereof. The secondary inflator comprises a secondary housing having a secondary initiator and secondary gas generating energetics disposed therein. A choke plate having an opening therethrough is positioned between the secondary energetics and the pressure vessel closure. A secondary rupture disk is secured to the choke plate to close the opening therein.

18 Claims, 2 Drawing Sheets

Multiple Level Inflator

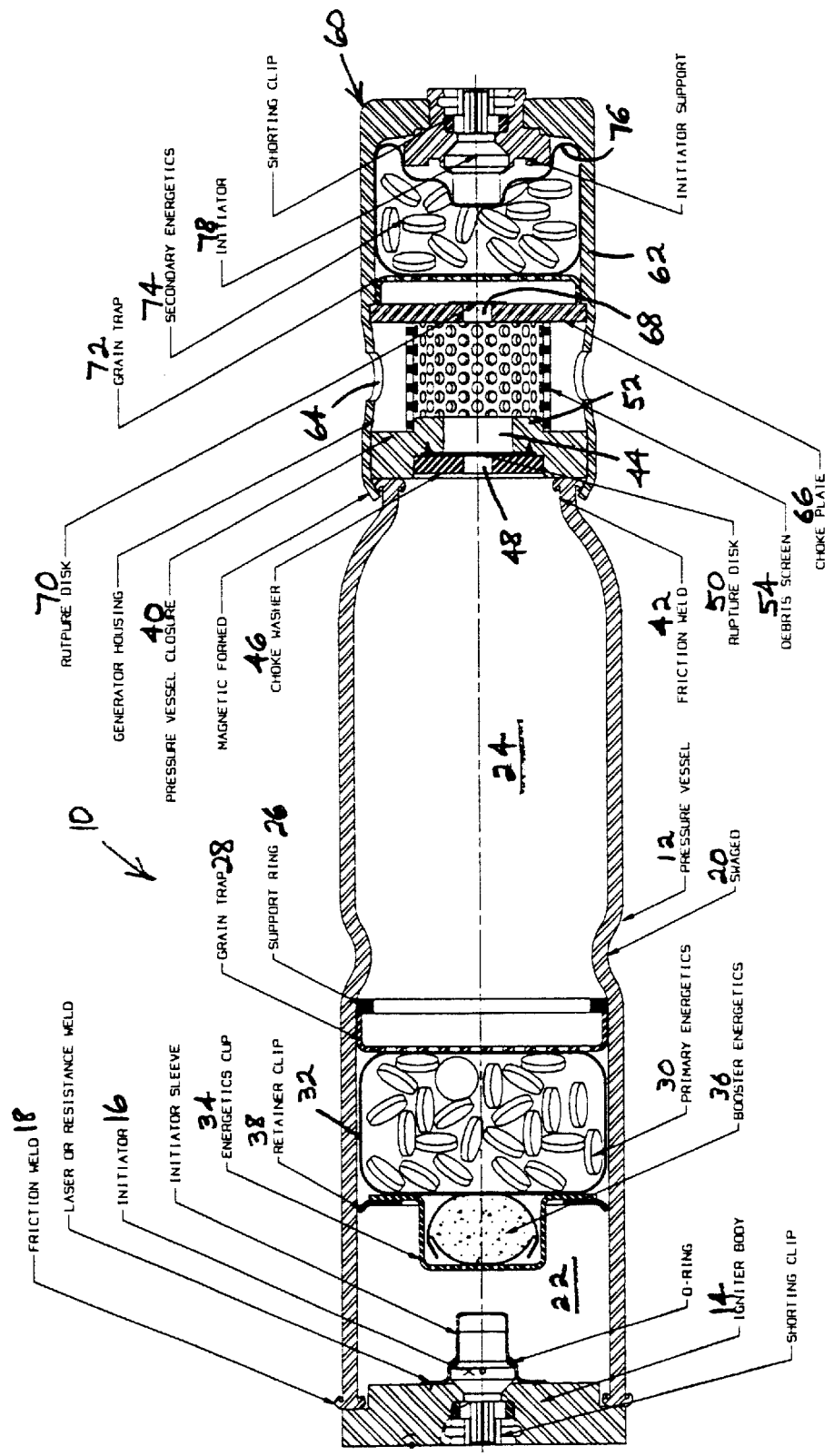
Multiple Level Inflator - Figure 1

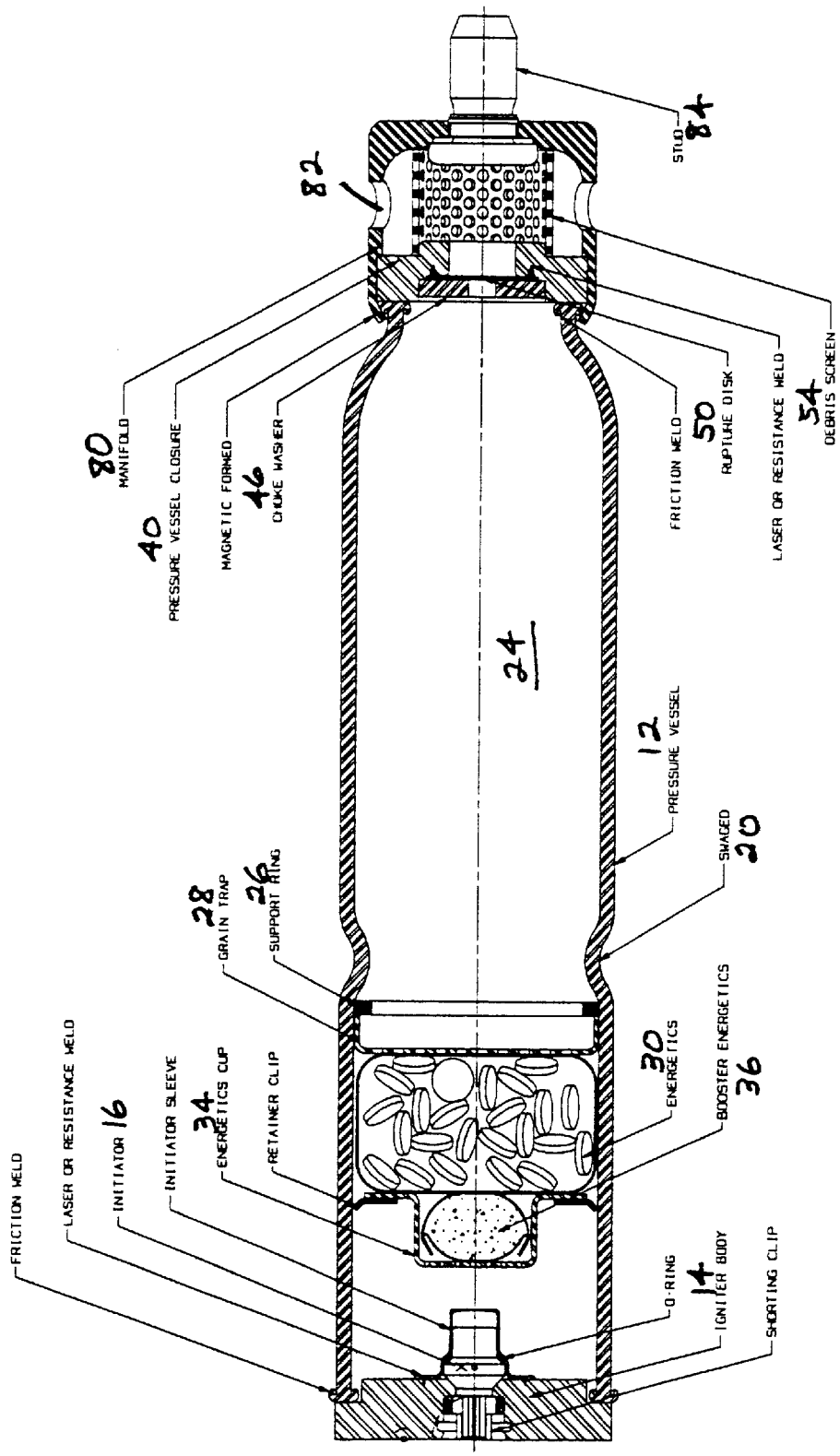
Single Level Inflator - Figure 2

COMPACT MULTI-LEVEL INFLATOR

BACKGROUND OF THE INVENTION

1. Field of the Invention

The present invention relates generally to an inflator for an air bag or other safety restraint device and, more specifically, to a compact multi-level output hybrid/all-pyrotechnic inflator which can selectively release gas at different rates and levels and thus enable the air bag or another type of inflatable safety restraint device to be deployed at different output levels in accordance with different sensor inputs.

2. Description of the Related Art

Recently, there has been a demand for controlling the rate and amount of inflation of safety devices such as air bag restraint systems in accordance with variables such as passenger size, position, seat belt usage and the velocity of a vehicle at the time of collision.

In order to provide optimal occupant protection, different levels of output are required from the airbag inflator. For example, in a high-speed collision with a large unbelted person, full rapid inflation of the air bag is required to provide the best restraint. In lower speed crashes with smaller sized occupants or even out-of-position occupants, a lower, slower rate of inflation is required so as not to inadvertently injure the occupant but still provide enough inflation to effect appropriate restraint.

In currently available air bag inflators intended for multi-level or variable output function, the performance is accomplished primarily with inflators which are made up of two individual inflators of the same type that may share one manifold, or by individual propellant chambers in a common pressure vessel sharing one common manifold.

Utilizing two separate inflators of the hybrid type, for example, results in large, heavy and expensive designs since nearly every component is duplicated. For example, there are two distinct pressure vessels, with redundant closures, seals, and in some cases diffusers or manifolds. Additionally, there is the added requirement of securing the two inflators to a common platform, which in turn increases cost, weight, and complexity in manufacturing.

The second approach of having separate propellant chambers encapsulated in one common pressure vessel results in more efficient packaging and reduced cost if the components are shared by the two propellant charges. To achieve different levels of inflation, it has been proposed in U.S. Pat. No. 3,773,353 to Trowbridge et al. to provide two separate charges and to ignite one in the event that a slow inflation is required and to ignite both in the event of a high speed collision, thus achieving the very rapid inflation and deployment of the air bag which is necessary under such circumstances. In this device the charges are arranged within a housing which is filled with a non-toxic gas under pressure. This housing is sealed by a burst plate that is punched out by a piston and rod type of arrangement when a first of the two charges is detonated. This arrangement suffers from the drawback of being relatively complex and therefore, relatively expensive. For example, no less than three burst plate arrangements are necessary. Also, the charges are each isolated from the reservoir and reservoir gas by an inner housing and a respective rupturable closure.

U.S. Pat. No. 3,905,515 to Allemann discloses another multi-stage inflator assembly which utilizes two separate charges and which disposes the charges in a chamber which is used to store a non-noxious gas under pressure. However, this arrangement is even more complex than that in U.S. Pat. No. 3,773,353. In this arrangement a portion of the burst disc forms the head of a slidable shuttle valve member which is projectable into an exhaust passage to partially throttle the outflow of gases following a detonation of one or both of the two charges.

Consequently, there is a need for a cost-effective, lightweight, compact, simple multi-level inflator for air bags and the like. This need is met by the new and improved multi-level inflator of the present invention.

SUMMARY OF THE INVENTION

It is an object of the present invention, therefore, to overcome the disadvantages of the prior art and to provide a cost-effective, lightweight, compact and simple multi-level inflator which is reliable in operation.

A further object of the present invention is to provide a multi-level inflator with two gas generators, which permits ignition of the gas generators either separately, simultaneously or in a timed sequence to effect air bag inflation at different rates in accordance with sensor inputs resulting from a crash or the like.

It is a further object of the present invention to provide a multi-level inflator which utilizes a common pressure vessel for a hybrid type gas generator and an all-pyrotechnic type gas generator.

Still another object of the present invention is to provide such a multi-level inflator which is simple in construction and easy to assemble to minimize the cost and size of the assembly.

These and other objects of the present invention are achieved by providing a multi-level inflation device for inflating a vehicle safety restraint such as an air bag comprising a common pressure vessel for a primary hybrid type gas generator and a secondary all-pyrotechnic type gas generator that are isolated from each other. Within the scope of the present invention, either gas generator can be the primary one. The gases from the primary and secondary gas generators are directed to a common manifold for inflation of the air bag. The combination of a hybrid gas generator and an all all-pyrotechnic gas generator in a single multi-level inflator minimizes size and cost. Also, simple assembly methods, such as magnetic forming, swaging, crimping and welding may be used to assemble the multi-level inflator because of its simple construction.

BRIEF DESCRIPTION OF THE DRAWINGS

FIG. 1 is a side elevational view in section of a first embodiment of the multi-level inflator of the present invention; and FIG. 2 is a side elevational view in section of a second embodiment of the inflator of the present invention constructed for single level operation.

DESCRIPTION OF THE PREFERRED EMBODIMENTS

FIG. 1 illustrates a first embodiment of the multi-level air bag inflator 10 of the present invention. The inflator 10 comprises an elongated pressure vessel 12 formed of any suitable material, such as steel, aluminum or the like. An igniter body 14 formed of any suitable material, such as steel, aluminum or the like, and supporting a primary initiator 16 is secured to a first end of the pressure vessel 12 in any suitable manner, such as by a friction weld 18. The pressure vessel 12 is formed with an indentation 20 near the mid-portion thereof that may be in the form of an annular indentation or a plurality of separate indentations such as dimples. The indentation 20 serves to define a first gas generant portion 22 of the pressure vessel between the indentation and the initiator 16, and a second gas storage portion 24 between the indentation 20 and the second or opposite end of the pressure vessel 12.

Within the first gas generant portion 22 of the pressure vessel there is mounted a support ring 26 adjacent the indentation 20 and a primary grain trap 28 disposed adjacent the support ring and comprising an apertured base with an annular flange in engagement with the support ring 26. Primary gas generating energetics 30 of any suitable construction, such as pellets formed of any suitable gas generating composition, are mounted within the first portion 22 of the pressure vessel 12 adjacent to the apertured base of the primary grain trap 28. The gas generating pellets 30 may be contained in a bag 32 of any suitable type or may be loosely contained in the pressure vessel portion 22 adjacent the primary grain trap 28 without a surrounding bag or the like. Also, the primary energetics 30 may be in the form of a solid grain or the like.

On the side of the primary energetics 30 opposite to the grain trap 28 there is provided an energetics cup 34 that encloses a booster charge 36. The energetics cup 34 is provided with a perforated end portion disposed adjacent to the initiator 16. A retainer clip 38 or the like engages the annular flange of the energetics cup 34 and the surrounding portion of the pressure vessel 12 to hold the energetics cup 34 in position in spaced relation to the grain trap 28 to enclose the primary energetics 30.

A pressure vessel closure 40 formed of any suitable material, such as steel, aluminum or the like, is secured to the opposite or second end of the pressure vessel 12 in any suitable manner such as by a friction weld 42 or the like. The pressure vessel closure 40 has an aperture 44 extending therethrough and a choke washer 46 mounted in an enlarged recess on the inner end thereof adjacent the second gas storage portion 24 of the pressure vessel 12. The choke washer 46 is crimped or welded in place and has a central aperture 48 that is of a size smaller than the aperture 44 of the pressure vessel closure 40. Disposed between the choke washer 46 and the pressure vessel closure aperture 44 is a primary rupture disc 50 of any suitable construction which may be laser welded to the pressure vessel closure 40. The outer end of the pressure vessel closure 40 is formed with an annular flange 52 on which a perforated debris screen or filter 54 is mounted.

The first gas generant portion 22 and the second gas storage portion 24 of the pressure vessel 12 are filled with an inert gas, such as a mixture of argon and helium under a predetermined pressure. Any suitable inert gas or gas mixture may be used. The pressure vessel 12, therefore, encloses a primary gas generator of the hybrid type.

A secondary gas generator 60 of the all-pyrotechnic type comprises a housing 62 formed of any suitable material, such as steel, aluminum or the like, that is secured at its inner end to the pressure vessel closure 40 and pressure vessel 12 by magnetic forming, crimping or the like. Magnetic forming uses an electromagnetic field to move metals similar to a roll crimp.

The secondary gas generator housing 62 comprises a manifold portion having a plurality of spaced apertures 64 that surround the debris screen 54 and are in communication with the air bag (not shown) or other device to be inflated.

A choke plate 66 is mounted within the housing 62 and is disposed adjacent the outer end of the debris screen 54. The choke plate 66 has an opening 68 that is closed by a secondary rupture disc 70 of any suitable construction mounted on the outer or inner side of the choke plate. A secondary grain trap 72 is mounted within the secondary gas generator housing 62 on the outer side of the choke plate 66 and comprises an apertured base and an annular flange in engagement with the choke plate. Secondary gas generating energetics 74 in the form of gas generating pellets are disposed in the housing 62 adjacent to the apertured base of the secondary grain trap 72 and preferably are enclosed in a vapor-proof barrier bag 76. The secondary energetics may be of any suitable construction or composition. A secondary initiator 78 is mounted on the outer end of the housing 62 and is disposed adjacent to the secondary energetics 74 in the housing 62.

In the assembly of the inflator 10 of the present invention, the support ring 26, primary grain trap 28, primary energetics 30, energetics cup 34 with the booster charge 36 and the retainer clip 38 are inserted within the first end of the gas generant portion 22 of the pressure vessel 12 and secured in place. The indentation 20 in the pressure vessel 12 insures the proper positioning of these components within the gas generant portion 22 of the pressure vessel 12. Thereafter, the igniter body 14 having the initiator 16 mounted thereon is secured to the first end of the pressure vessel 12.

Either before, after or simultaneously with the assembly of the components in the gas generant portion 22, the pressure vessel closure 40 having the choke washer 46, primary rupture disc 50 and debris screen 54 mounted thereon is secured to the second or opposite end of the pressure vessel 12 adjacent the gas storage portion 24 thereof. The first gas generant portion 22 and the gas storage portion 24 of the pressure vessel 12 are filled with the inert gas mixture under the predetermined pressure through a fill opening (not shown) in the igniter body 14 or at any other suitable location.

The inner open end of the secondary gas generator housing 62 containing the hereinbefore described secondary gas generating components is then positioned over and secured to the pressure vessel closure 40 and pressure vessel 12 in the manner described herein. Because of the simple construction of the inflator 10, it will be noted that it is easily assembled into a multi-output hybrid/all-pyrotechnic inflator and its size can be minimized.

The types of gas generating compositions used for the primary energetics 30, booster charge 36 and secondary energetics 74 will depend on the intended multi-output operation of the inflator 10. Any suitable gas generating compositions may be used that are within the knowledge of those skilled in the art.

In one operation of the inflator 10, upon the sensing of a vehicle crash or the like, the primary initiator 16 will be fired to ignite the booster charge 36 and primary energetics 30 to generate primary combustion gas that passes through the primary grain trap 28 into the gas storage portion 24 containing the pressurized inert gas mixture. The further pressurization of the inert gas mixture by the primary combustion gas causes the primary rupture disc 50 to fail and allows the pressurized gas to exit through the opening 48 in the choke washer 46, through the aperture 44 in the pressure vessel closure 40 and then through the debris screen 54 and manifold apertures 64 in the secondary gas generator housing 62 to inflate the air bag (not shown).

After the primary hybrid gas generator is actuated and the air bag is inflated, the secondary initiator 74 is fired to ignite the secondary energetics 74 and generate secondary gas which will pass through the secondary grain trap 72 to burst the secondary rupture disc 70 and enter the debris screen 4 and gas storage portion 24 of the pressure vessel 12. In this manner, the all-pyrotechnic secondary energetics are disposed of in a manner that minimizes the re-inflation of the air bag for the reason that the gas storage portion 24 of the pressure vessel 12 serves as a plenum for the secondary gases.

Depending on the nature of the vehicle crash and other variables such as passenger size and position, the secondary energetics 74 may be fired alone, simultaneously with or in a timed sequence before or after the firing of the primary energetics 30 to establish different rates and levels of inflation of the air bag. The combustion gases of the all-pyrotechnic secondary energetics 74 are cooled by the pressurized inert gas from the gas storage portion 24 of the pressure vessel 12 as they both enter the debris screen 54 prior to exiting the manifold apertures 64 in the secondary housing 62 to inflate the air bag.

FIG. 2 illustrates a second embodiment of the inflator 10 wherein it is modified for single-level inflation. In the second embodiment, the hybrid primary inflator mounted within and secured to the pressure vessel 12 is substantially identical to that in the first embodiment shown in FIG. 1. Instead of the all-pyrotechnic secondary gas generator 60, a manifold 80 having exit apertures 82 surrounding the debris screen 4 is mounted on the pressure vessel closure 40 and pressure vessel 12 by magnetic forming or the like. The manifold 80 is provided with a mounting stud 84 or the like on the outer end thereof. It is noted, therefore, that the simple construction of the subject inflator 10 allows it to be easily assembled for multi-level or single level operation.

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims.

What is claimed is:

1. A multi-level inflator for an air bag or other safety restraint device, comprising:

an elongated pressure vessel having a primary gas generating portion with a first open end and a gas storage portion with a second open end;

said primary gas generating portion having a primary initiator and primary gas generating energetics disposed therein, said initiator being mounted on an igniter body secured to and closing said pressure vessel at said first open end;

a pressure vessel closure secured to said second end of said pressure vessel, said closure having an aperture therethrough and a primary rupture disk secured thereto to close said aperture;

said gas storage portion having an inert gas therein under a predetermined pressure; and a secondary inflator of the all-pyrotechnic type secured to said pressure vessel and closure at said second end, said secondary inflator comprising a secondary housing having a secondary initiator and secondary gas generating energetics disposed therein, and a choke plate positioned between said secondary energetics and said pressure vessel closure, said choke plate having an opening therethrough and a secondary rupture disk secured thereto to close said opening;

said pressure vessel having an indentation therein for defining said primary gas generating portion and said gas storage portion; and said primary gas generating portion having disposed therein a support ring in engagement with said indentation, and a primary grain trap disposed adjacent to said support ring and having an apertured base disposed adjacent to said primary energetics.

2. The inflator of claim 1 further comprising a booster charge disposed in said primary gas generating portion on the side of said primary energetics opposite to said primary grain trap, said booster charge being disposed adjacent to said initiator, and a retainer clip in engagement with the adjacent surface of said pressure vessel in said primary gas generating portion for retaining said booster charge, said primary energetics, said primary grain trap and said support ring in position therein.

3. The inflator of claim 1 wherein a debris screen is secured to the outer portion of said pressure vessel closure and is in communication with said closure aperture.

4. The inflator of claim 1 wherein said pressure vessel, said closure and said secondary inflator housing are formed of metal, and said secondary inflator housing is secured to said pressure vessel and said closure by magnetic forming.

5. The inflator of claim 1 wherein an apertured secondary grain trap is disposed in said secondary housing between said secondary energetics and said choke plate.

6. The inflator of claim 1 wherein said secondary inflator housing comprises a manifold portion having a plurality of exit apertures therethrough in communication with said pressure vessel closure aperture.

7. The inflator of claim 1 wherein said choke plate opening is in substantial alignment with said pressure vessel closure aperture.

8. The inflator of claim 1 wherein said secondary energetics are enclosed in a vapor-proof barrier bag.

9. A method of forming a multi-level inflator for an air bag or other safety restraint device, comprising:

providing an elongated pressure vessel having an indentation near the mid-portion thereof for defining a primary gas generating portion with a first open end and a gas storage portion with a second open end;

inserting a support ring and primary grain trap in said primary gas generating portion adjacent to said indentation;

inserting primary gas generating energetics in said primary gas generating portion adjacent to said primary grain trap;

securing an igniter body having an initiator mounted on the inner end thereof to said first open end of said pressure vessel;

either before, after or simultaneously with the assembly of said primary energetics and said igniter body, securing a pressure vessel closure to the second open end of said pressure vessel, said pressure vessel closure having an aperture therethrough and a primary rupture disk secured thereto to close said aperture; and mounting a secondary inflator of the all-pyrotechnic type on said closure and said pressure vessel, said secondary inflator comprising a secondary housing having a secondary initiator and secondary gas generating energetics disposed therein, and a choke plate disposed between said secondary energetics and said pressure vessel closure, said choke plate having an opening therethrough and a secondary rupture disk secured thereto to close said opening.

10. The method of claim 9 wherein said pressure vessel and said secondary inflator housing are formed of metal, and said secondary inflator housing is secured to said pressure vessel and said closure by magnetic forming.

11. The method of claim 10 wherein said igniter body and said pressure vessel closure are formed of metal and are secured to said pressure vessel by welding.

12. An inflator for an air bag or other safety restraint device, comprising:

an elongated pressure vessel having a primary gas generating portion with a first open end and a gas storage portion with a second open end;

said primary gas generating portion having a primary initiator and primary gas generating energetics disposed therein, said initiator being mounted on an igniter body secured to and closing said pressure vessel at said first open end;

a pressure vessel closure secured to said second end of said pressure vessel, said closure having an aperture therethrough and a primary rupture disk secured thereto to close said aperture;

said gas storage portion having an inert gas therein under a predetermined pressure; and a manifold secured to said pressure vessel and said closure, said manifold comprising a plurality of exit apertures in communication with said closure aperture;

wherein a choke washer is mounted on the interior portion of said pressure vessel closure and comprises an opening therethrough in alignment with said closure aperture, and said primary rupture disk is positioned between said choke washer opening and said closure aperture.

13. The inflator of claim 12 wherein a debris screen is mounted on the exterior portion of said pressure vessel closure and is in communication with said closure aperture, and said manifold exit openings are disposed in surrounding relation to said debris screen.

14. The inflator of claim 12 wherein said pressure vessel comprises an indentation therein defining said primary gas generating portion and said gas storage portion.

15. The inflator of claim 12 wherein said pressure vessel and said manifold are formed of metal, and said manifold is secured to said pressure vessel and said closure by magnetic forming.

16. A multi-level inflator for an air bag or other safety restraint device, comprising:

an elongated pressure vessel having a primary gas generating portion with a first open end and a gas storage portion with a second open end;

said primary gas generating portion having a primary initiator and primary gas generating energetics disposed therein, said initiator being mounted on an igniter body secured to and closing said pressure vessel at said first open end;

a pressure vessel closure secured to said second end of said pressure vessel, said closure having an aperture therethrough and a primary rupture disk secured thereto to close said aperture;

said gas storage portion having an inert gas therein under a predetermined pressure; and a secondary inflator of the all-pyrotechnic type secured to said pressure vessel and closure at said second end, said secondary inflator comprising a secondary housing having a secondary initiator and secondary gas generating energetics disposed therein, and a choke plate positioned between said secondary energetics and said pressure vessel closure, said choke plate having an opening therethrough and a secondary rupture disk secured thereto to close said opening;

wherein an apertured secondary grain trap is disposed in said secondary housing between said secondary energetics and said choke plate.

17. A multi-level inflator for an air bag or other safety restraint device, comprising:

an elongated pressure vessel having a primary gas generating portion with a first open end and a gas storage portion with a second open end;

said primary gas generating portion having a primary initiator and primary gas generating energetics disposed therein, said initiator being mounted on an igniter body secured to and closing said pressure vessel at said first open end;

a pressure vessel closure secured to said second end of said pressure vessel, said closure having an aperture therethrough and a primary rupture disk secured thereto to close said aperture;

said gas storage portion having an inert gas therein under a predetermined pressure; and a secondary inflator of the all-pyrotechnic type secured to said pressure vessel and closure at said second end, said secondary inflator comprising a secondary housing having a secondary initiator and secondary gas generating energetics disposed therein, and a choke plate positioned between said secondary energetics and said pressure vessel closure, said choke plate having an opening therethrough and a secondary rupture disk secured thereto to close said opening;

wherein a debris screen is secured to the outer portion of said pressure vessel closure and is in communication with said closure aperture, said choke plate is in engagement with the outer end of said debris screen, and said secondary inflator housing comprises a manifold portion having a plurality of exit apertures surrounding and in communication with said debris screen.

18. A multi-level inflator for an air bag or other safety restraint device, comprising:

an elongated pressure vessel having a primary gas generating portion with a first open end and a gas storage portion with a second open end;

said primary gas generating portion having a primary initiator and primary gas generating energetics disposed therein, said initiator being mounted on an igniter body secured to and closing said pressure vessel at said first open end;

a pressure vessel closure secured to said second end of said pressure vessel, said closure having an aperture therethrough and a primary rupture disk secured thereto to close said aperture;

said gas storage portion having an inert gas therein under a predetermined pressure; and a secondary inflator of the all-pyrotechnic type secured to said pressure vessel and closure at said second end, said secondary inflator comprising a secondary housing having a secondary initiator and secondary gas generating energetics disposed therein, and a choke plate positioned between said secondary energetics and said pressure vessel closure, said choke plate having an opening therethrough and a secondary rupture disk secured thereto to close said opening;

wherein said pressure vessel closure further comprises a choke washer having an opening therethrough in alignment with said closure aperture, and said primary rupture disk is disposed between said choke washer opening and said closure aperture.

* * * * *